March 20, 1962     J. D. BROWN ET AL     3,025,673
PRESSURE FLUID POWER SYSTEM AND CONTROL MEANS THEREFOR
Filed Oct. 22, 1958     13 Sheets-Sheet 1
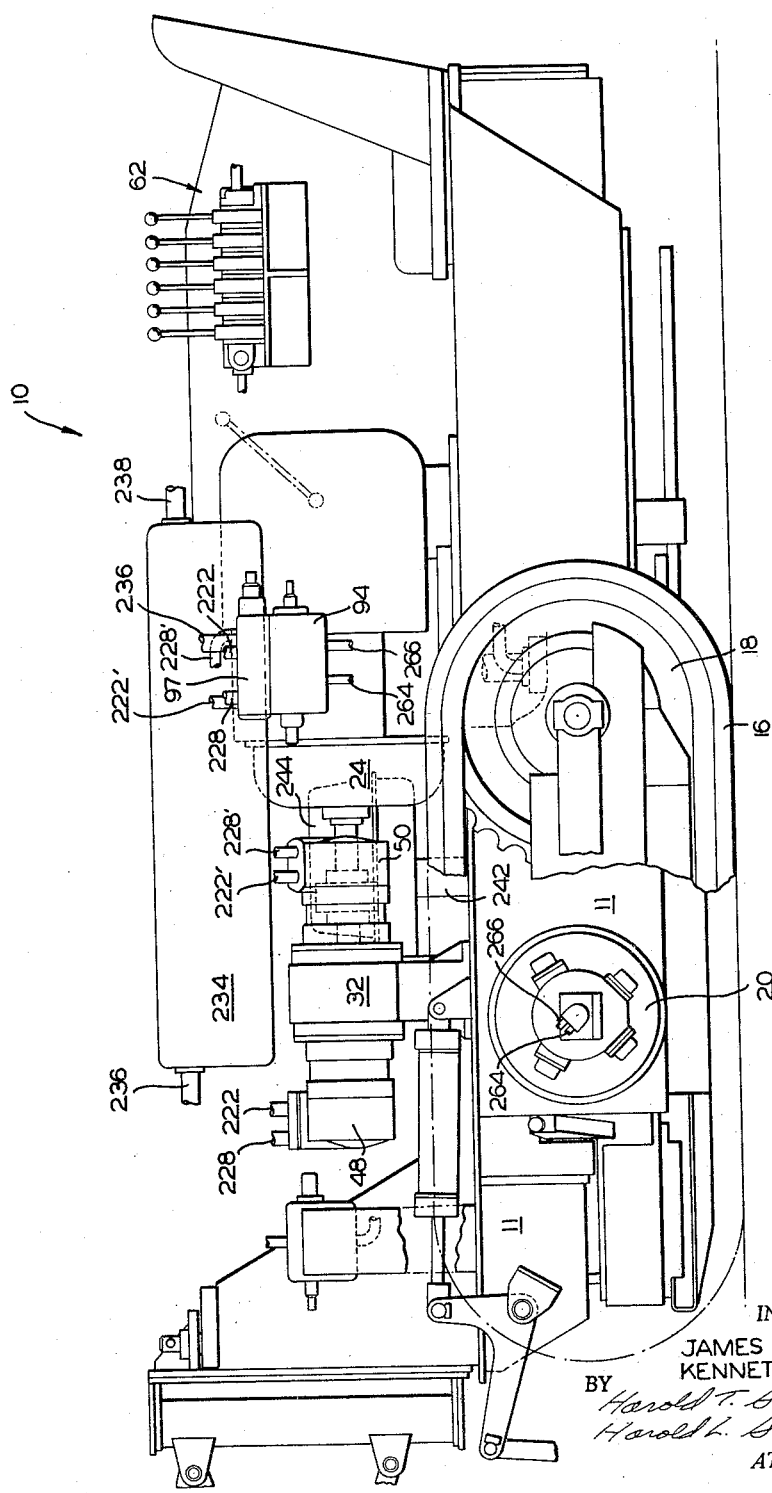
INVENTOR.
JAMES D. BROWN
KENNETH H. HOEN
BY
ATTORNEYS

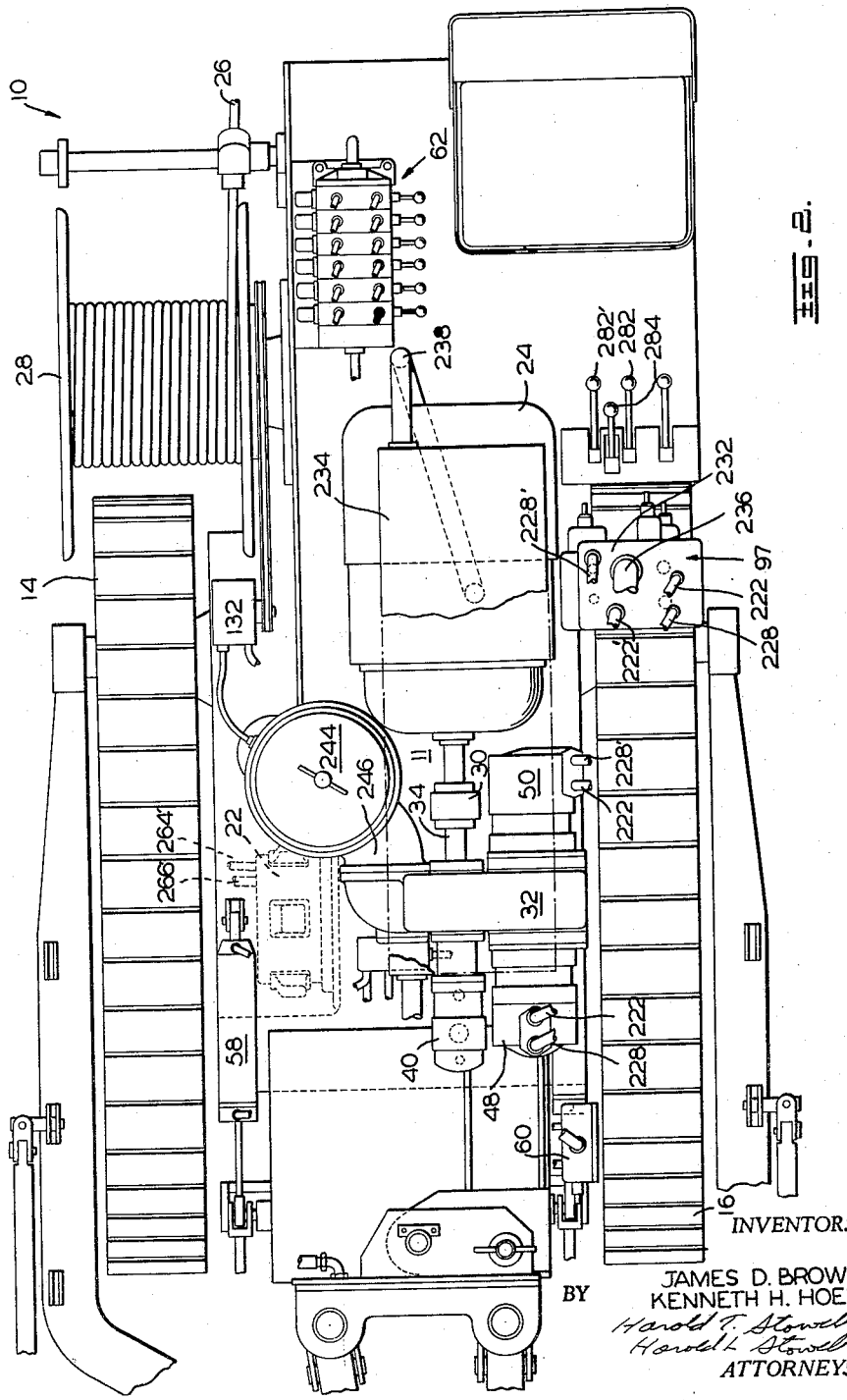

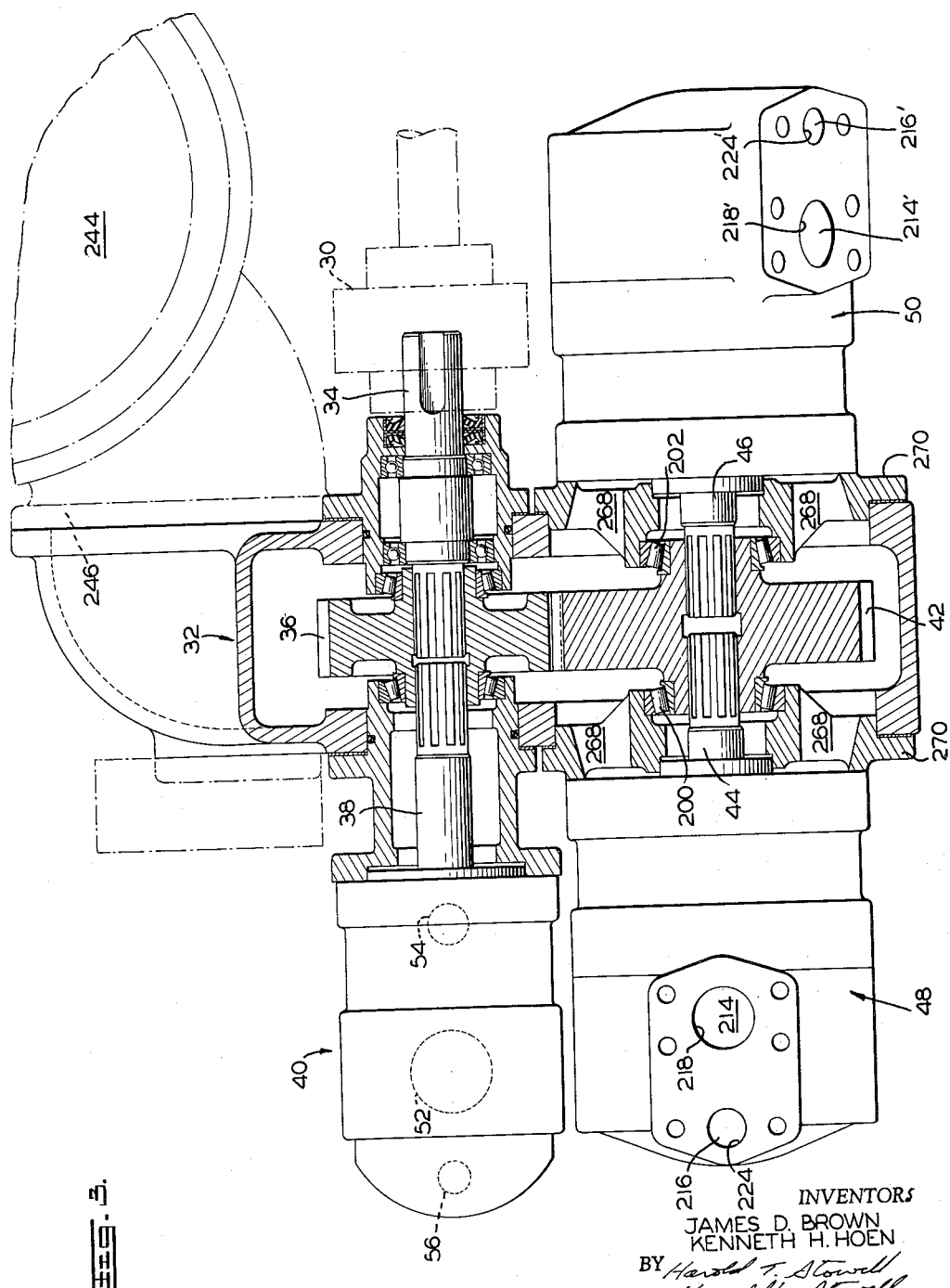

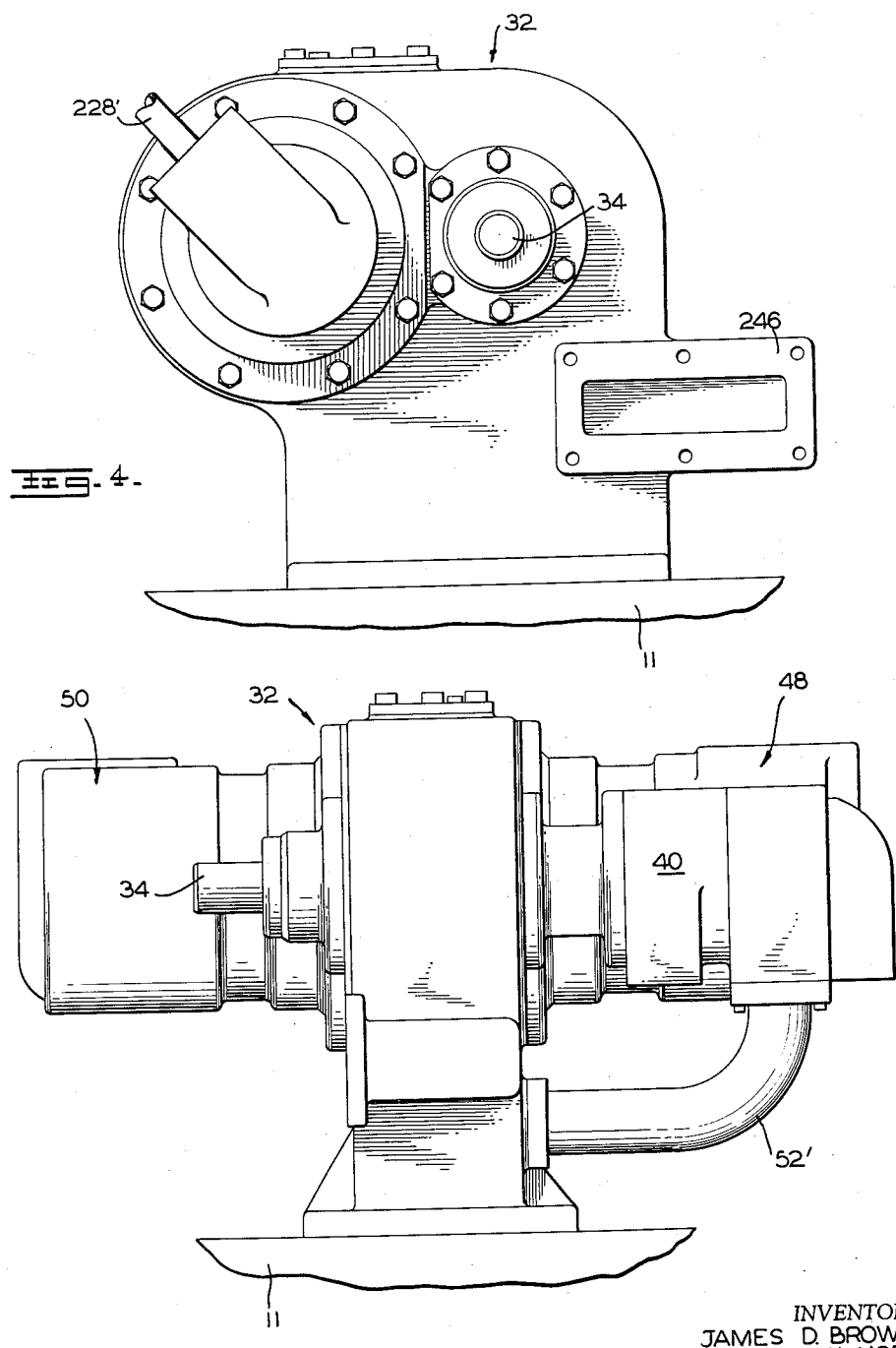

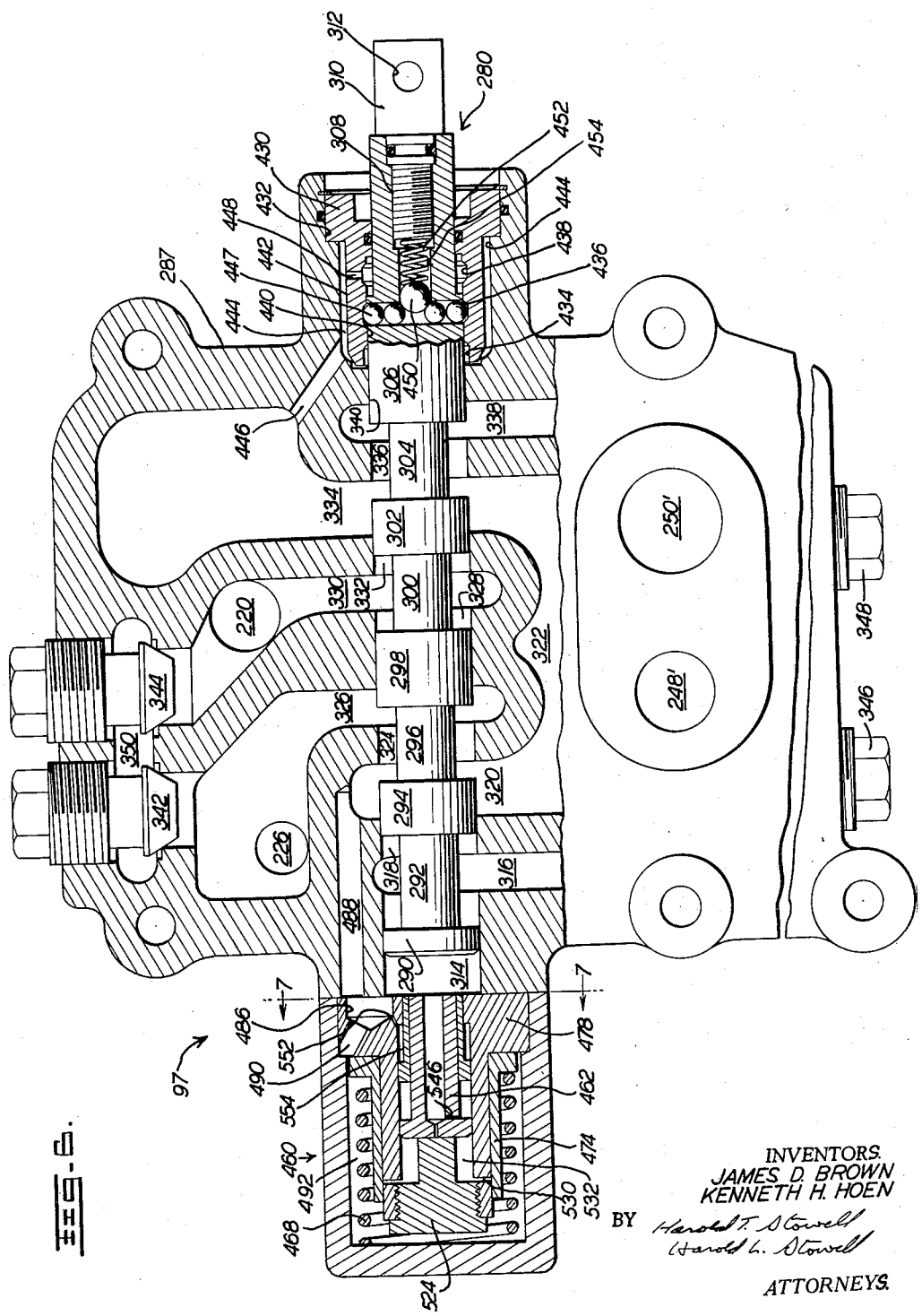

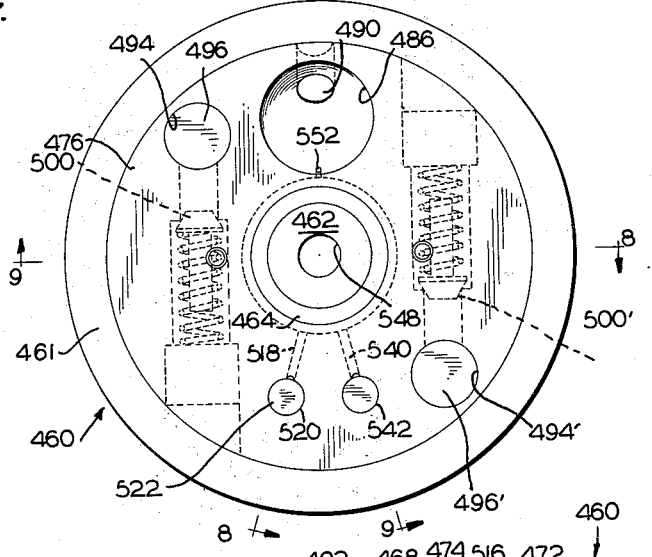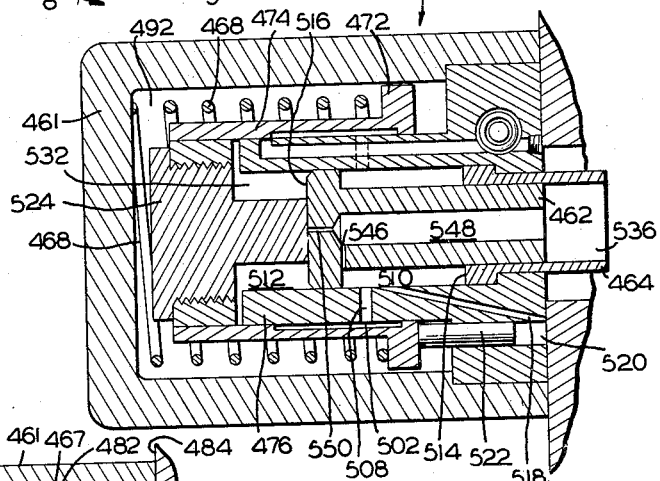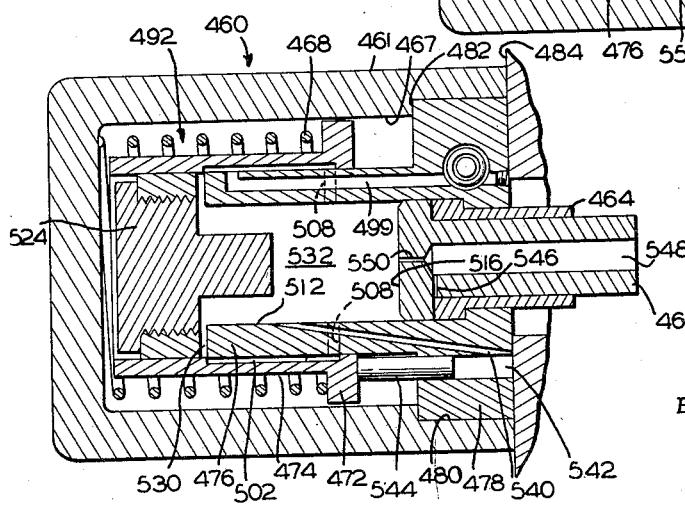

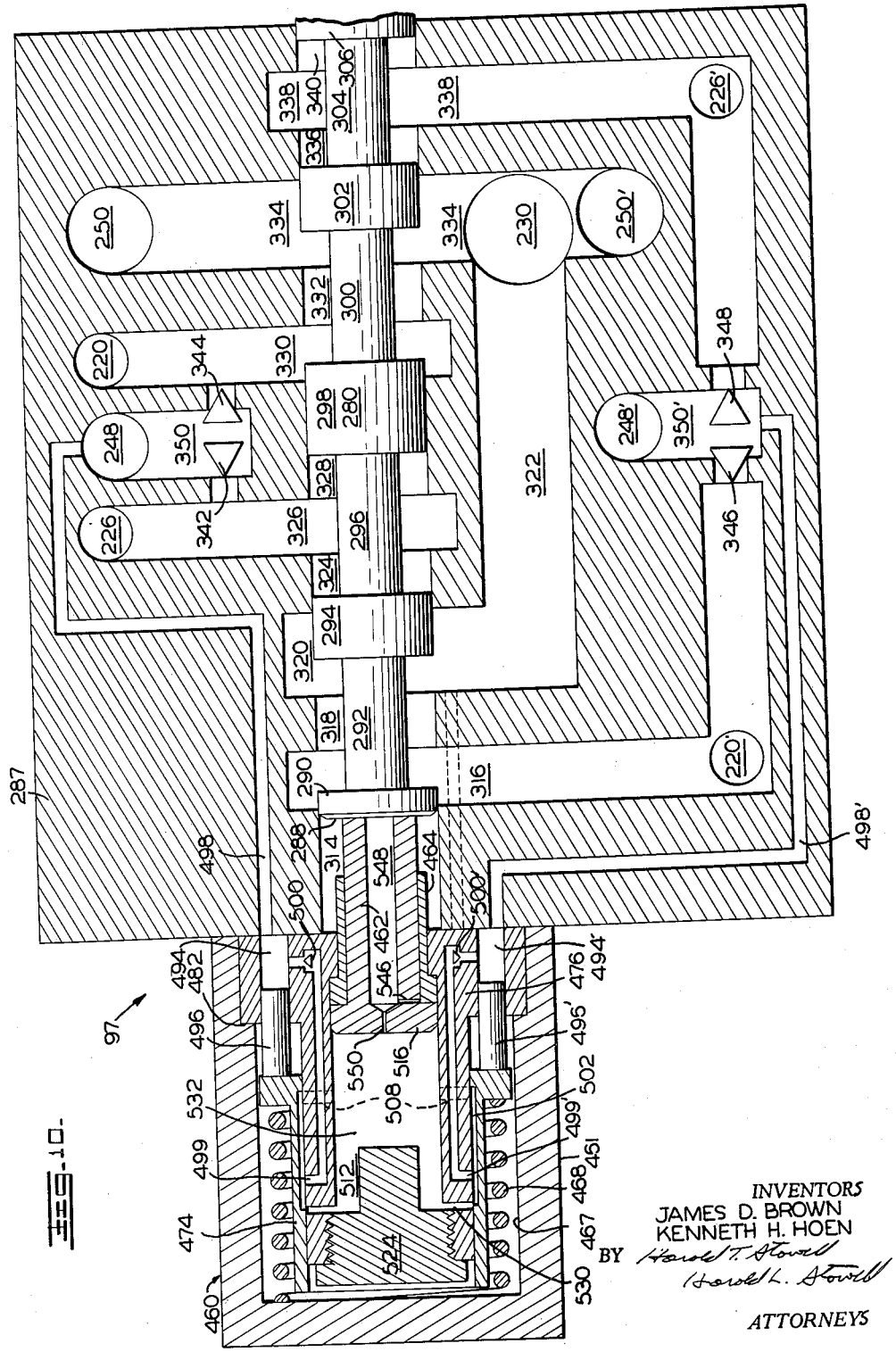

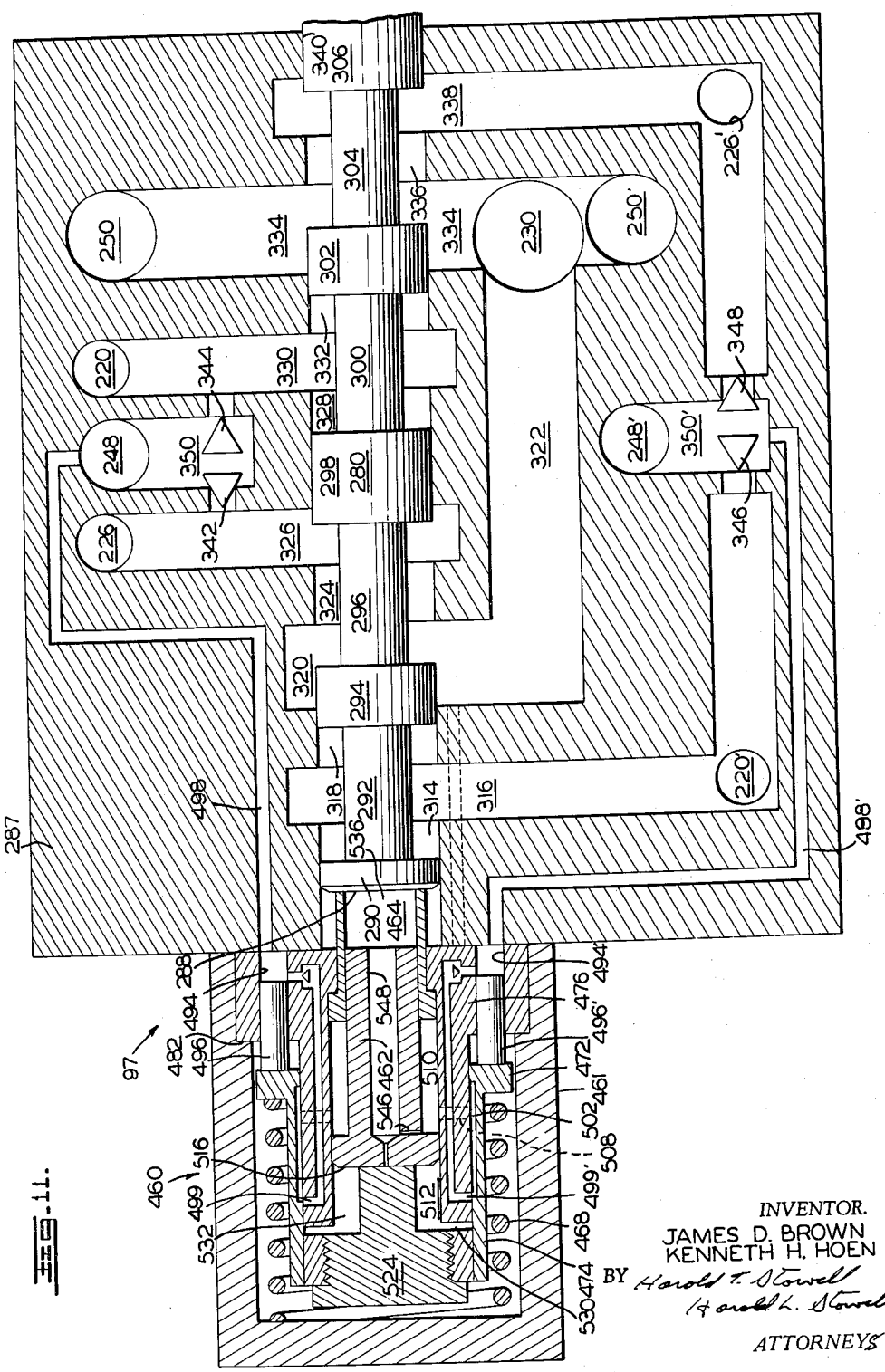

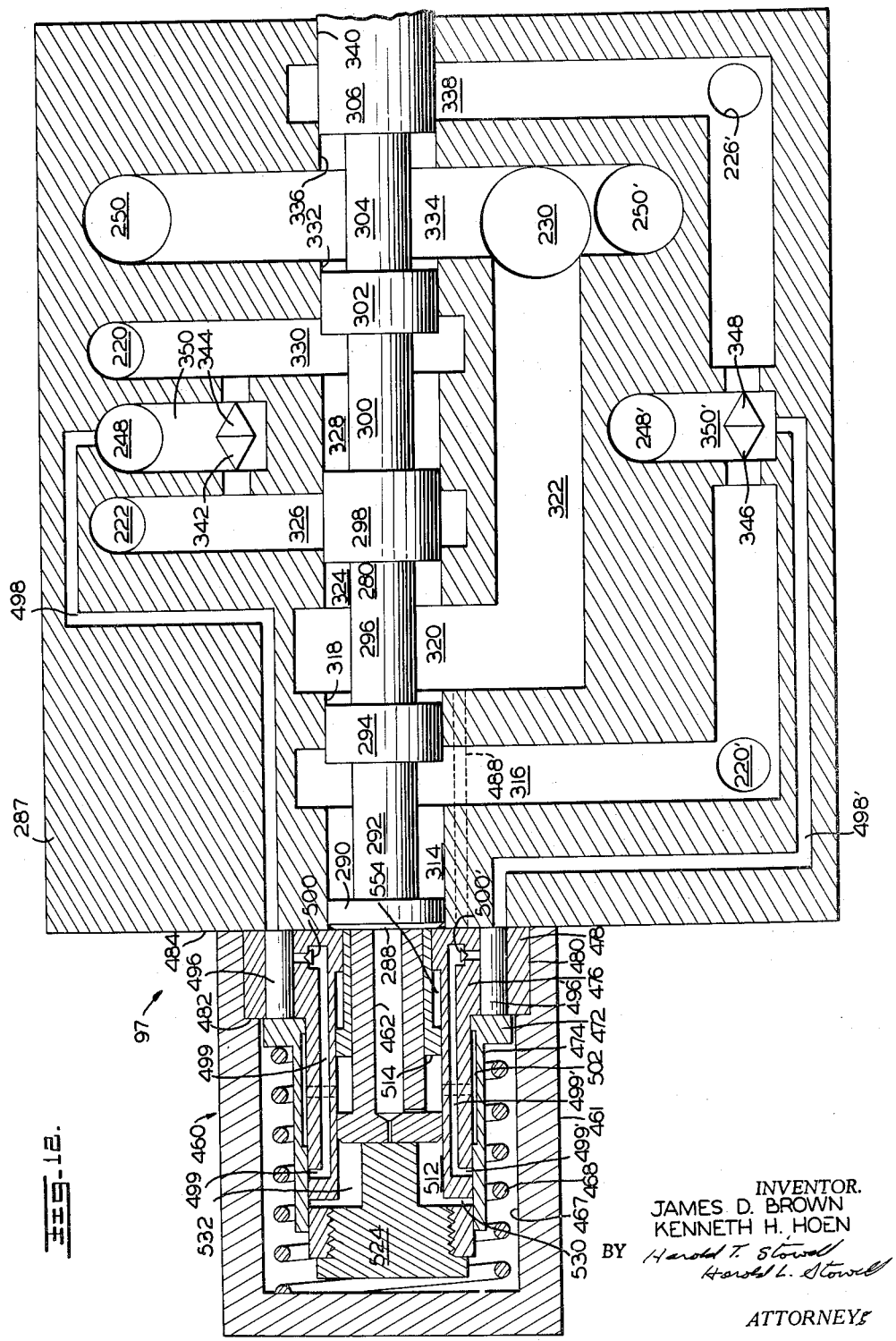

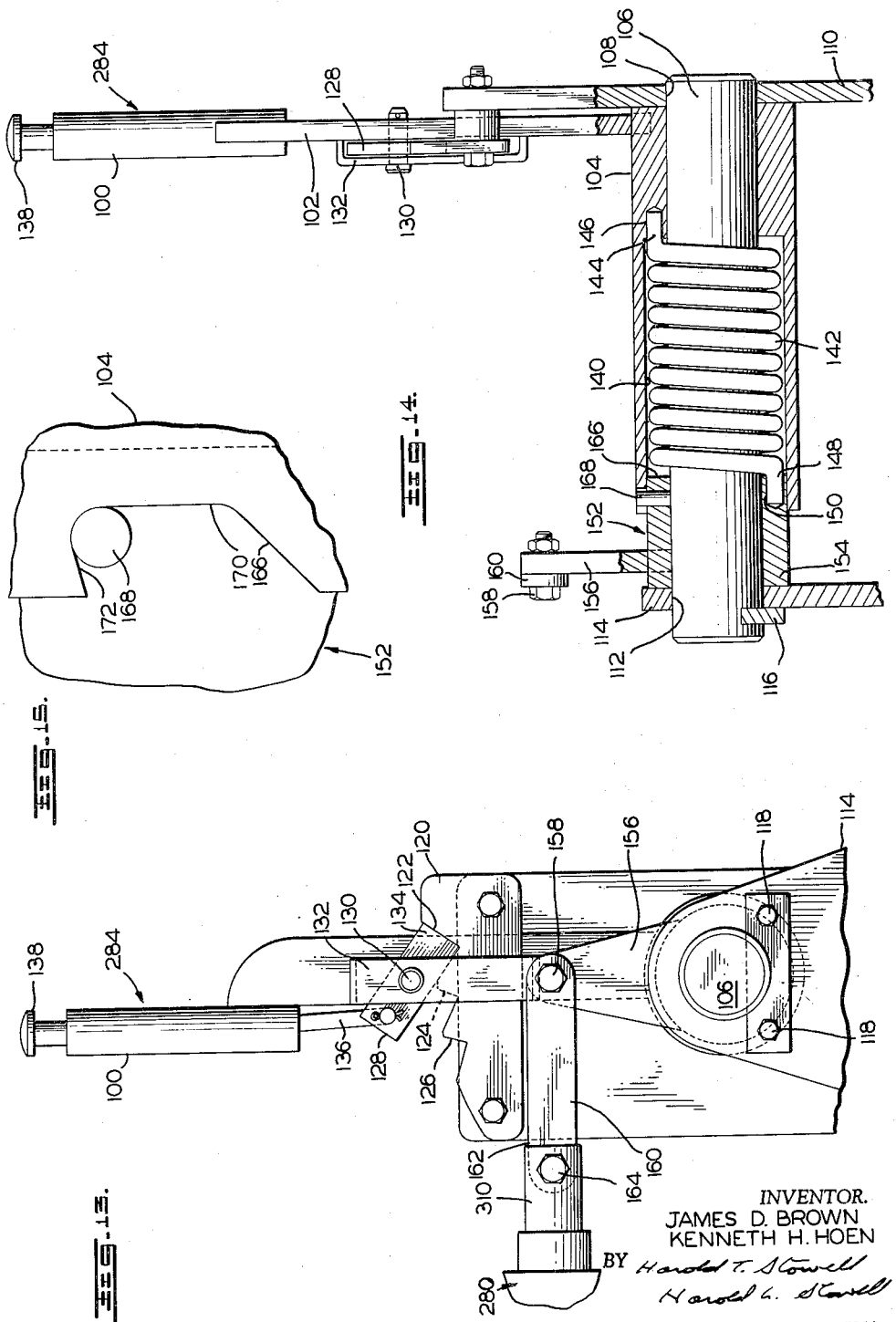

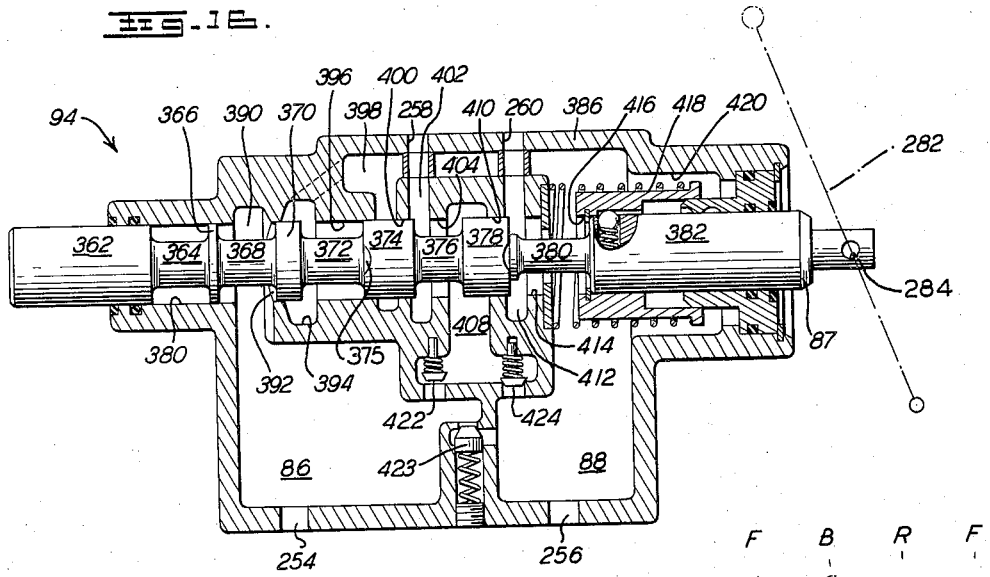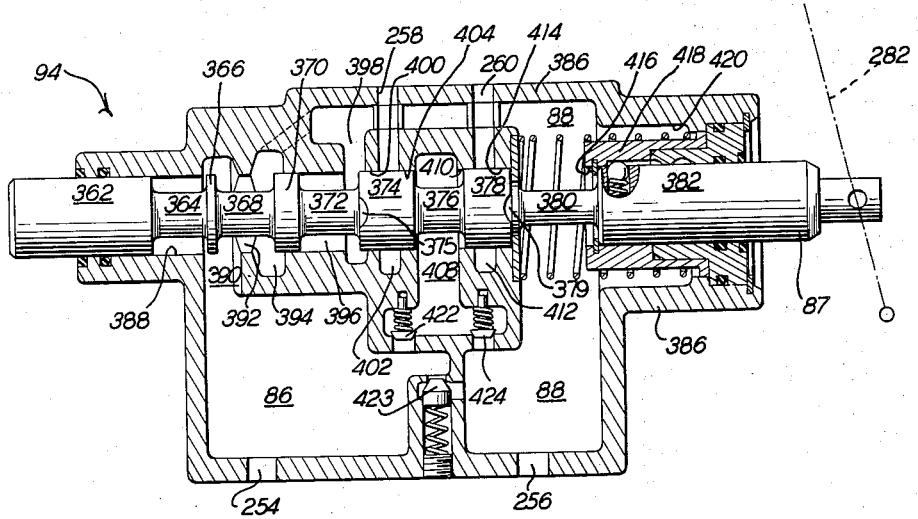

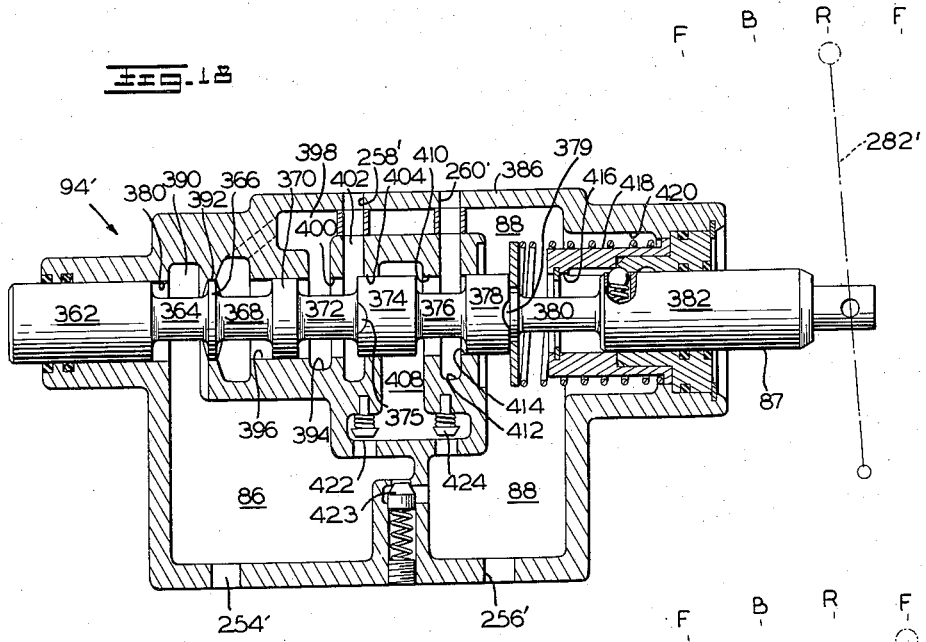
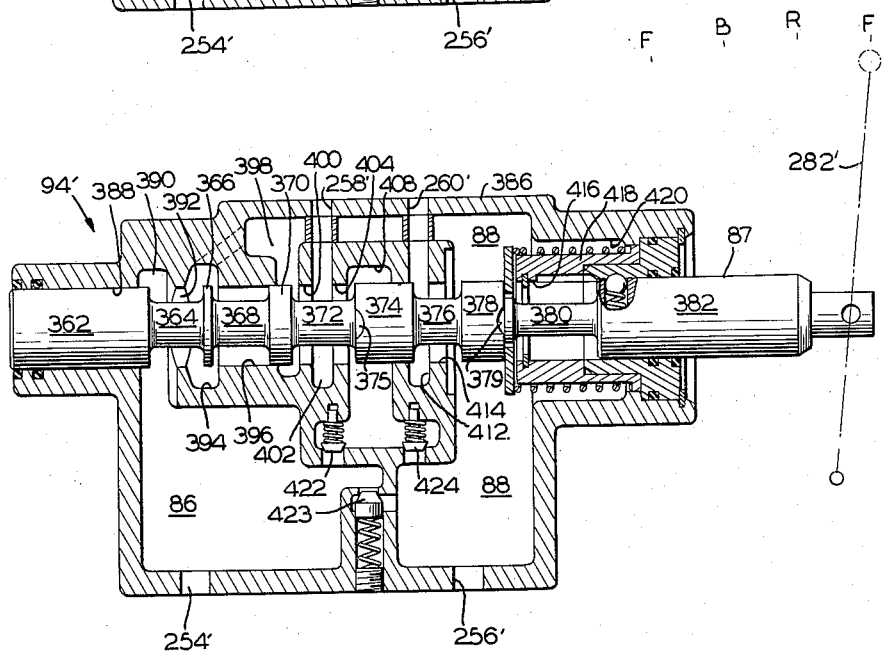

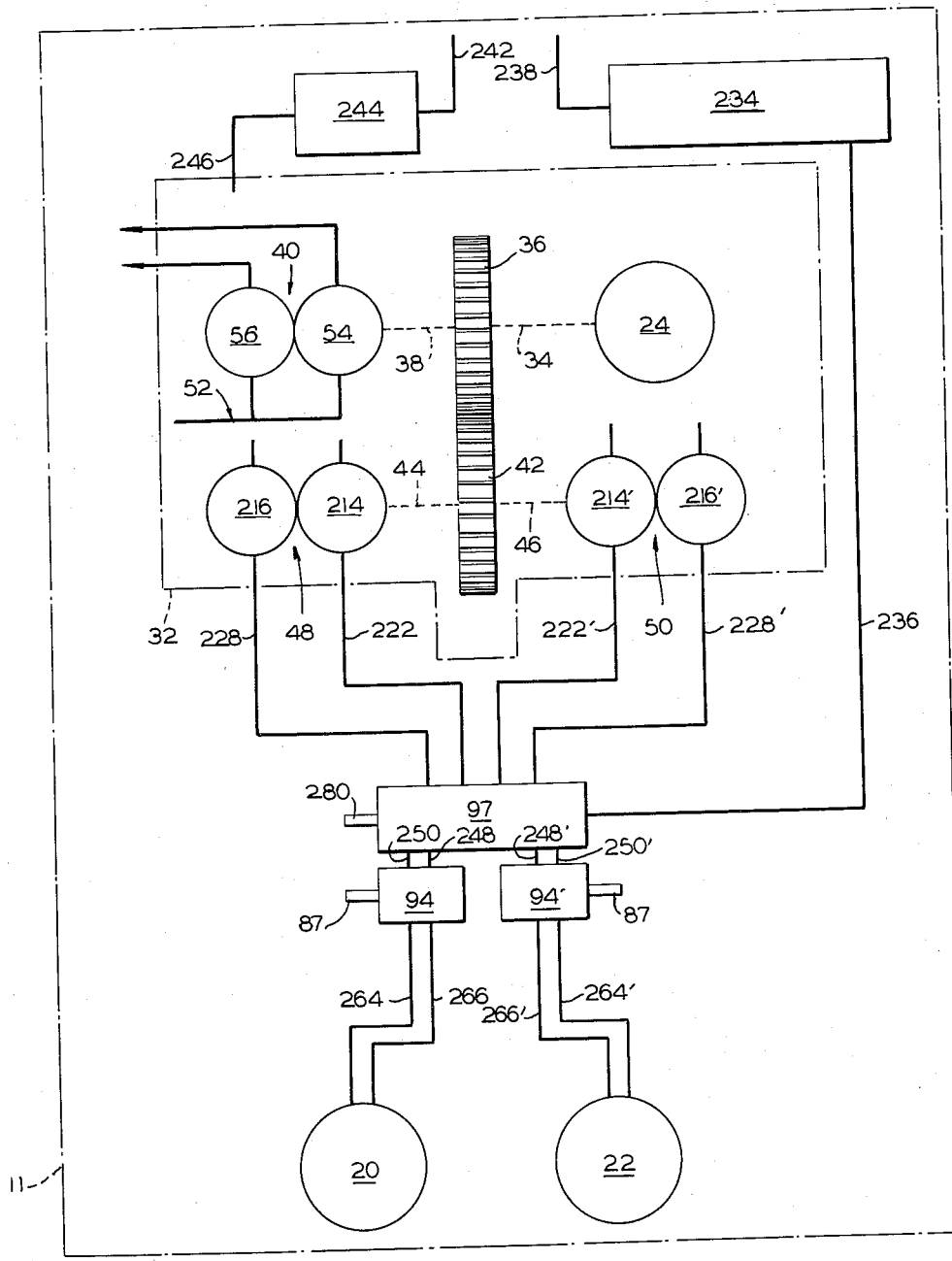

United States Patent Office 3,025,673
Patented Mar. 20, 1962

3,025,673
PRESSURE FLUID POWER SYSTEM AND
CONTROL MEANS THEREFOR
James D. Brown and Kenneth H. Hoen, Salt Lake City,
Utah, assignors to The Eimco Corporation, Salt Lake
City, Utah, a corporation of Delaware
Filed Oct. 22, 1958, Ser. No. 768,883
14 Claims. (Cl. 60—53)

This invention relates to a new and improved pressure fluid power system and to control means therefor. It is a particular object of the invention to provide a pressure fluid power system for the operation of single or plural motion devices from plural sources of pressure fluid with control means provided in the system to limit the power loading on the prime mover and to provide for substantially constant power output at varying flow capacities.

A further object of the invention is to provide such a system having particular utility as a power system for material handling machines which require a wide range of torque speed ratios, and which must be extremely versatile, and relatively simple and rugged in construction.

A further object is to provide control means for such a system including manual speed selecting means and automatic means to override the manual speed selecting means responsive to the torque demands on the material handling machine.

Another object is to provide automatic means to override the manual speed selecting means including means for eliminating hunting conditions in the system.

A further object is to provide such a device wherein when excessive torque demands on the material handling machine are removed the manual speed selecting means controls the speed of the connected motion device.

A further object is to provide control means for a pressure fluid power system wherein an automatic speed selecting means is substantially independent of transient pressure changes within the system.

These and other objects and advantages are provided in a pressure fluid system including plural sources of pressure fluid, manually controlled pressure flow selecting means connected by conduit means to the plural sources of pressure fluid, further conduit means connecting the flow selecting means to at least one pressure fluid actuated motor means, pressure fluid control means in the further conduit means between the flow selecting means and the motor means and automatic means to override the manual control for the flow selecting means. The objects of the invention are further provided in a pressure fluid control means including a body member, a spool slidably mounted in a bore in the body member, plural lands and grooves on the spool, plural pressure fluid inlet means in the body member, plural pressure fluid outlet means in the body member, internal passages in the body member connecting the spool bore and the plural pressure fluid inlet and outlet means, manual control means for moving the spool in the bore whereby the lands and grooves thereon open and close communication between selected inlet means and selected outlet means through the bore and pressure fluid responsive means contacting said spool to override the manual control for the spool for opening and closing communication between certain inlet means and certain outlet means through the bore in the body member.

The invention will be more particularly described with reference to the illustrative embodiments of the invention shown for purposes of illustration as applied to a crawler mounted material handling machine, wherein:

FIG. 1 is a side elevational view of a crawler mounted material handling machine provided with the pressure fluid power system of the invention;

FIG. 2 is a plan view of the vehicle shown in FIG. 1;

FIG. 3 is an enlarged fragmentary sectional view in plan of the drive means for the pressure fluid system of the invention;

FIG. 4 is a rear elevational view of the device shown in FIG. 3;

FIG. 5 is a right-side elevational view of the structure shown in FIG. 4;

FIG. 6 is an enlarged fragmentary sectional view of the flow controlling means of the invention;

FIG. 7 is a section substantially on line 7—7 of FIG. 6;

FIG. 8 is a section substantially on line 8—8 of FIG. 7;

FIG. 9 is a section substantially on line 9—9 of FIG. 7;

FIG. 10 is a diagrammatic view of the flow control valve means shown in FIG. 6 with the spool in the low-speed position;

FIG. 11 is a diagrammatic view similar to that shown in FIG. 10 with the valve spool in the medium flow position;

FIG. 12 is a diagrammatic view of the flow control valve similar to that shown in FIG. 10 with the spool in the high flow position;

FIG. 13 is an enlarged fragmentary view of the manual control lever for the flow control means shown in FIGS. 6 and 10 through 12;

FIG. 14 is a fragmentary sectional view of the manual control means shown in FIG. 13;

FIG. 15 is an enlarged fragmentary view of the coupling means for the manual control lever shown in FIGS. 13 and 14;

FIG. 16 is an enlarged fragmentary sectional view of a motor control valve with the valve spool in the forward drive position;

FIG. 17 is a view similar to that shown in FIG. 16 with the valve spool in the motor "block" position;

FIG. 18 is a view similar to that shown in FIG. 16 with the valve spool in the vehicle reverse position;

FIG. 19 is a view of the motor control valve similar to that shown in FIG. 16 with the valve spool in the "float" position; and FIG. 20 is a circuit diagram of the hydraulic system for the vehicle shown in FIGS. 1 and 2.

Referring to the drawings and, in particular, to FIGS. 1 and 2, 10 generally designates a crawler mounted material handling machine, embodying the present inventive concepts and comprising, in general, a main frame or body 11 carried by a pair of longitudinally extending ground-engaging crawler frames having endless tracks 14 and 16. Each of the crawler tracks 14 and 16 is drivably connected to its respective sprocket 18 shown for the left-hand crawler track 16 in FIG. 1 of the drawings. Each of the sprockets 18 is drivably connected through suitable gear means to its respective motor 20 or 22 secured to the main frame or body 11 of the vehicle. The body 11 is of hollow formation and comprises a storage reservoir for a portion of the hydraulic fluid employed in the system of the invention. Details of the mounting means for the motors 20 and 22 and the interconnection between the motors and the drive sprockets 18 for the endless crawler treads 14 and 16 is disclosed in U.S. Patent No. 2,833,361, D. M. Schwartz.

The motors 20 and 22 are fluid pressure operated and for the purposes of illustration of the present invention, the motors are operated by hydraulic fluid.

The main frame 11 of the material handling machine also supports a prime mover 24 which for the purposes of illustration is an electric motor, however, it will be apparent that the electric motor 24 may be replaced by other type prime movers. The electric motor 24 is connected to an external source of electric current by conductor 26 carried by cable reel assembly generally designated 28.

The electric motor 24 is connected by conventional coupling means 30 to a transmission generally designated 32 carried by the main frame 11 of the vehicle.

Referring to FIGS. 3, 4 and 5, in addition to FIGS. 1 and 2, the transmission 32 includes an input shaft 34 rotatably supported in the transmission housing, and connected to the coupling means 30. The input shaft 34 drives a spur gear 36 and a coaxial shaft 38 splined to the hub of spur gear 36. Shaft 38 is connected to a conventional dual output hydraulic pump generally designated 40. Spur gear 36 meshes with spur gear 42 also rotatably supported in the transmission housing.

Coaxial shafts 44 and 46 are splined to the hub of spur gear 42 and shaft 44 drives a conventional dual output pump 48 and shaft 46 drives a conventional dual output pump 50.

With this arrangement of prime mover 24, transmission 32 and double pumps 40, 48 and 50, it will be seen that pump 40 is continuously driven by the prime mover 24 and at its speed of rotation while double pump units 48 and 50 are also constantly driven by the prime mover 24 through reduction gearing 36 and 42 whereby each of the double pumps 48 and 50 are driven at the same speed.

Double pump 40, which draws hydraulic fluid from gear housing 32 through suction line 52' (FIG. 5 of the drawings) has, for the purposes of illustration, a 12 gallon per minute output section 54 and a 3 gallon per minute output section 56. Pump section 54 supplies hydraulic fluid under pressure for power delivery to double acting cylinders 58 for raising and lowering, for example, a dozer blade as controlled by a valve 60 and other attachments forming no part of this invention through valve bank 62.

Pump section 56 supplies hydraulic fluid under pressure to the cable reel control valve 132 for the motor of cable reel 28.

Double pump unit 48 has a 40-gallon per minute output section 214 and an 18-gallon per minute output section 216. Output section 214 is provided with outlet port 218 which is connected to primary inlet port 220 of selector valve 97, FIGS. 6–12, by hydraulic fluid line 222. Output section 216 is provided with outlet port 224 which is connected to secondary inlet port 226 of selector valve 97 by hydraulic line 228. Double pump unit 50 has a 40-gallon per minute output section 214' and an 18-gallon per minute output section 216'. Output section 214' is provided with outlet port 218' which is connected to primary inlet port 220' of selector valve 97 by hydraulic fluid line 222'. Output section 216' is provided with outlet port 224' which is connected to secondary inlet port 226' of selector valve 97 by hydraulic line 228'. Selector valve 97 has an exhaust port 230 at the top 232 which is connected to a hydraulic fluid tank 234, mounted at the top of the machine, by exhaust line 236.

Line 238 connects tank 234 to vehicle housing 11. Pressure fluid pipe and filter support 242 joins vehicle housing 11 and filter case 244 and supports filter case 244 above the crawler housing 11. Filter case 244 is provided with conduit extension 246 for connection with and fluid circulation to gear case 32, FIGS. 2 and 3.

Selector valve 97 is provided with outlet ports 248 and 248' respectively and return ports 250 and 250' respectively on the bottom side for the respective duplicate valves 94 and 94' for the crawler motors 20 and 22.

Valves 94 and 94' are identical in construction and function with valve 94 connected to motor 20 and valve 94' connected to motor 22. Valve 94 is shown in FIGS. 16 and 17 and valve 94' is shown in FIGS. 18 and 19. In these figures identical parts having identical functions are given the same reference number and where identical parts in the 94 and 94' valves require separate designation, primed reference numbers are employed in FIGS. 18 and 19.

Valves 94 and 94' (which are mounted to the bottom of selector valve 97) have respective inlet ports 254 and 254' and respective outlet ports 256 and 256' in alignment with respectively outlet ports 248 and 248' and return ports 250 and 250' of valve 97. Valves 94 and 94' are each equipped with two ports 258 and 260 and 258' and 260' which are connected with respectively left hydraulic drive motor 20 and right hydraulic drive motor 22 by conduits 264, 266, 264' and 266'. The gear trains driven by hydraulic drive motors 20 and 22 for driving the left and right tracks are contained within crawler housing 11 and are lubricated by hydraulic fluid of the system.

The hydraulic fluid in this hydraulic fluid power system flows by suction from crawler housing 11 upward through pipe 242, FIG. 1, into and through filter 244. Fluid is drawn from filter 244 through outlet 246 and into gear case 32 from which, in turn, it is drawn by double pump unit 40 through suction line 52' connected to port 52 and in much greater flow by double pump units 48 and 50. Double pump units 48 and 50 draw the greater bulk of the fluid flow of the system through passages 268 about the bearing mounts of double pump mount members 270 of gear housing 32 as shown in FIG. 3. These members 270 mount gear 42 in gear case 32 via bearings 200 and 202 and double pump units 48 and 50 to the front and rear respectively of the case 32. The main flow of fluid passes from double pump units 48 and 50 through lines 222, 228, 222' and 228' to selector valve 97 and valves 94 and 94' whereby varying amounts of the flow may be diverted directly to exhaust line 236. On the other hand, part of the time, varying amounts of the flow from pumps 48 and 50 passes through valve 97 and valves 94 and 94' to and through lines 264, 266, 264' and 266' to fluid pressure operated motors 20 and 22, for forward or reverse travel of the tracks 14 and 16 as controlled by valves 94 and 94' and then back to and through valves 94, 94' and 97 to exhaust line 236.

Exhaust line 236 carries fluid to the forward end of top mounted tank or reservoir 234. Hydraulic fluid after next having passed from the front to the rear of tank 234 passes through line 238 to crawler housing 11. This provides a three section reservoir for the hydraulic system of the invention including tank 234, the crawler housing or main frame 11 and the gear case 32 in a system that utilizes hydraulic fluid for gear train lubrication in crawler housing 11 and in gear case 32.

Referring particularly to FIGS. 6 through 12, valve 97 has a single valve spool 280 designed to deliver the output of the double pumps 48 and 50 to the two motor control valves 94 and 94' in any of three different volumes. Fluid flow from double pump units 48 and 50 is maintained separate for the respective left and right hydraulic drive motors 20 and 22 in the three different volumes for each as simultaneously controlled by the single spool 280 in valve 97. Control of valves 94 and 94' is imposed upon these respective separate fluid flows for forward or reverse flow to and drive of or cut off of either or both hydraulic drive motors 20 and 22 as desired.

Manual control levers 282 and 282' are connected to respective spools 87 of valves 94 and 94' and manual control lever 284 is connected to spool 280 of valve 97 by resilient means illustrated in FIGS. 13, 14 and 15.

Manual control means 284 for positioning spool 280 of valve 97 includes a handle portion 100 secured to lever arm 102. The lower end of control handle lever arm 102 is secured to a sleeve member 104 concentrically and pivotally mounted on a shaft 106. One end of shaft 106 is mounted in a bore 108 in plate 110 carried by the material handling machine. The other end of shaft 106 passes through a bore 112 in a further plate member 114 also secured to the frame of the vehicle. A retainer member 116 engages a slot in the shaft 106 and the plate 116 is secured by cap screws 118 to the plate 114 whereby the shaft 106 is maintained in its fixed relationship between the plates 110 and 114.

Plate member 110 also supports a rack member 120 provided with ratchet elements 122, 124 and 126. A pawl 128 is pivotally mounted by pin 130 to a bracket 132 secured, such as by welding, to a portion of the lever arm 102.

One end 134 of the pawl 128 is adapted to engage the ratchet elements 122, 124 or 126 and the other end of the pawl receives a rod 136 provided with a thumb release element 138 projecting above the hand-engaging portion 109 of the manual control rod. Conventional spring means, not shown, within a bore in the handle 100 maintains the thumb-engaging portion 138 of the assembly in the extended position and upon overcoming the force of the spring, the control lever arm 102 may be moved to position the lower element of the pawl in one of the three positions on the rack 120.

A large bore 140 in the sleeve 104 is adapted to receive a helical spring 142. The helical spring 142 is spiraled about the shaft 106 and one end 144 of the spring is anchored in an axial bore 146 in the sleeve 104. The other end 148 of the spring 142 engages a similar bore 150 in a sleeve 152 bored to rotatably engage the shaft 106.

The sleeve 152 has an outside diameter such that an end telescopically engages the bore 140 in the extended end of the sleeve 104 while the other end 154 of the sleeve 152 abuts the inner surface of plate member 114. A lever arm 156 is secured to the cylindrical outer surface of the sleeve 152 and is provided at its remote end with attaching means 158 for one end of link 160. The other end 162 of link 160 is pivotally connected to end 310 of valve spool 280 by attaching means 164.

Adjacent end 166 of sleeve 152 is provided a radial pin 168 which engages a slot 170 in the sleeve 104 as more clearly shown in FIGS. 14 and 15. Through the foregoing construction, the manual control lever 102 is resiliently connected through spring 142 to the valve spool 280 of valve 97 and through another portion of travel is positively interconnected by means of pin 168 engaging face 172 of the slot 170. During operation of the manual control means 284, movement of lever arm 156 and, in turn, the valve spool 280 to the "high" and "medium" flow ranges is through the resilient spring 142 whereby automatic control means to be hereinafter described may overcome the biasing of spring 142 and reposition the valve spool 280 from the high and medium flow positions.

The separate fluid flows 18, 40, or 58 gallons per minute for respective drive motors 20 and 22, as controlled by the setting of spool 280 in valve 97 are: (1) volumes of secondary pump sections 216 and 216' for low, (2) volumes of primary pump sections 214 and 214' for medium or (3) combined volumes of respective primary and secondary pump sections 214 with 216 and 214' with 216' for high speed.

Referring again to FIGS. 6 through 12, the lands and recesses of spool 280 and the bores and passages in valve body 287 are so arranged that spool 280 is of the hydraulically balanced type. Spool 280 is formed with, successively from the left end, land 290, recess 292, land 294, recess 296, land 298, recess 300, land 302, recess 304, land 306 and is provided with threaded bore 308, FIG. 6, for member 310 which has means 312 for pivotal connection with linkage means from manual control lever 284.

Spool 280 is axially slidable in bore sections and in relation to passage cavities which are formed in valve body 287 in the following order: bore section 314, passage 316, bore section 318, branch 320 of exhaust cavity 322, bore section 324, passage 326, bore section 328, passage 330, bore section 332, branch 334 of exhaust cavity 322, bore section 336, passage 338, and bore 340.

Check valve assemblies 342, 344, 346 and 348 are threaded into valve body 287 in order that valve chamber 350, which connects with outlet port 248 for valve 94, be separated from valve passages 326 and 330 respectively and in order that valve chamber 350', which connects with outlet port 248' for valve 94', be separated from valve passages 316 and 338 respectively.

When valve spool 280 is moved to the extreme right low speed position illustrated diagrammatically by FIG. 10, the flow from double pump 48 secondary section 216 is blocked at the spool 280 by land 294 in bore section 324 and by land 298 in bore section 328 and the flow is forced through check valve 342 to chamber 350 and through port 248 to valve 94. At the same time, flow from double pump 48 primary section 214 flows from passage 330 to branch passage 334 of exhaust cavity 322 via spool recess 300 around bore section 332. Flow from double pump 50 secondary section 216' is blocked at the spool 280 by land 302 in bore section 336 and by land 306 in bore section 340 and the flow is forced through check valve 348 to chamber 350' and through port 248' to valve 94' at the same time flow from double pump 50 primary section 214' flows from passage 316 to branch passage 320 of exhause cavity 322 via spool recess 292 around bore section 318.

When valve spool 280 is moved to the medium speed position illustrated diagrammatically by FIG. 11 flow from double pump 48 primary section 214 is blocked at the spool 280 by land 298 in bore section 328 and by land 302 in bore section 332 and the flow is forced through check valve 344 to chamber 350 and through port 248 to valve 94. At the same time flow from double pump 48 secondary section 216 flows from passage 326 to branch passage 320 of exhaust cavity 322 via spool recess 296 around bore section 324. Flow from double pump 50 primary section 214' is blocked at the spool 280 by land 290 in bore section 314 and by land 294 in bore section 318 and the flow is forced through check valve 346 to chamber 350' and through port 248' to valve 94'. At the same time flow from double pump 50 secondary section 216' flows from passage 338 to branch passage 334 of exhaust cavity 322 via spool recess 304 around bore section 336.

When valve spool 280 is moved to the extreme left high speed position illustrated diagrammatically by FIG. 12 the flows from both the primary and secondary sections 214 and 216 of double pump 48 are blocked at spool 280 by lands 298 and 302 in bore section 324 and 328, and 332 respectively and the flows are both forced through respective check valves 342 and 344 to chamber 350 and together through port 248 to valve 94. The flows from both the primary and secondary sections 214' and 216' of double pump 50 are blocked at spool 280 by lands 290 and 294, and 306 in bore sections 314 and 318, and 336 and 340 respectively and the flows are both forced through respective check valves 346 and 348 to chamber 350' and together through port 248' to valve 94'.

Referring to FIGS. 16, 17, 18 and 19, spool 87 of each valve 94—94' is formed successively from the left end with land 362, recess 364, land 366, recess 368, land 370, recess 372, land 374, recess 376, land 378, recess 380, land 382 and is provided with means 284 for pivotal connection to manual control lever 282 or 282'. Spool 87 is axially slidable in bore sections and in relation to passage cavities which are formed in valve body 386 in the following order from the left to the right ends: bore section 388, passage 390 from chamber 86, bore section 392, passage 394 from chamber 88, bore section 396, passage 398 from chamber 88, bore section 400, passage 402 to port 258 or 258', bore section 404, chamber 408, bore section 410, passage 412 to port 260 or 260', bore section 414, chamber 88 and bore section 416 in position retaining detent member 418 which is mounted in bore 420 of valve body 386. Metering grooves 375 and 379 are provided in lands 374 and 378 respectively of valve spools 87 to provide controlled easy speed take-up for hydraulic motors 20 and 22 by manually easing spools 87 into position in valves 94 for forward or reverse.

Check valve 422 permits flow from chamber 86 to chamber 408 and vacuum valve 424 permits flow from chamber 88 to chamber 408 whenever the hydraulic motor 20—22 speed is higher than the operating speed as supplied by the double hydraulic pump 48 or 50. This may occur in valve 94 forward, reverse or float settings. Relief valve 423 opens to relieve excess pressure in chamber 86 and pass fluid to chamber 88 and exhaust.

When valve spool 87 is set to the forward drive position (F) of motor 20 (FIG. 16) flow of fluid under pressure enters through port 254 from valve 97 to chamber 86. It passes next through check valve 422 to chamber 408 and around spool recess 376 through bore 404 to passage 402 and through port 258 and line 264 for hydraulic motor 20. The fluid returns from motor 20 through line 266 to port 260 and through passage 412 to pass around spool recess 380 and through bore 414 to chamber 88 and then through port 256 back to exhaust of valve 97.

When spool 87 is moved one position to the right (FIG. 17) for brake setting (B) passages 402 and 412 for motor 20 are blocked by lands 374 and 378. Fluid flow from valve 97 is passed from chamber 86 by spool recess 368 through bore 392 to passage 394 and chamber 88 and to exhaust of valve 97.

When spool 87 is moved to reverse setting (R) (FIG. 18) fluid flows from chamber 86 through check valve 422, chamber 408, by spool recess 376 and through bore 410 for passage 412 and reverse drive of motor 20. Return flow passes from passage 402 by spool recess 372 and through bore 400 to passage 398 of chamber 88 and on to exhaust of valve 97.

When spool 87 is moved to float setting (F) (FIG. 19) chamber 86 and both passages 402 and 412 for motor 262 are open to chamber 88 and exhaust.

Valve 94' directs pressure fluid entering ports 254' from valve 97 to motor 22 through outlet ports 258' or 260' as the case may be and returns fluid from the motor 22 from valve 94' outlet port 256 to the exhaust section of valve 97.

Referring again to FIG. 6, valve 97 is provided with detent member 430 which is mounted in bore 432 of valve body 287. Detent member 430 is provided with three annular detent grooves 434, 436 and 438 in bore 440 which correspond to high, medium and low speed settings of valve spool 280. Bore 440 is within reduced diameter extension 442 of detent member 430 which extends into chamber 444 which is connected by passage 446 to exhaust chamber 322 in valve body 287. Passages 448 of member 430 connect detent groove 438 and bore 440 to exhaust via chamber 444. Outer balls 447 of the ball detent means are resiliently urged radially outward by ball 450 which is resiliently urged axially along the axis of spool 280 by spring means 452 within bore extension 454. Spring means 452 is retained in bore extension 454 of spool 280 by plug member 310.

Referring to FIGS. 6 through 12 an overload automatic control means 460 may be employed with the valve 97. Overload control means 460 includes a housing or body 461 mounted by conventional means on the left end of valve 97 with a large piston member 462 and a smaller piston member 464 in alignment with valve spool 280 in order that they may work against spool end 288. Control means 460 converts valve 97 from a manually operated valve to, in combination, a semi-automatically operated valve and operates to limit the combined horsepower output of double pump units 48 and 50 and thereby limit power loading of motor 24. It further provides means in the hydraulic system which may provide for substantially constant power output at varying flow capacities.

Bore 467 in the housing 461 retains coil spring 468. Spring 468, resiliently confined between the end of body 461 and flange 472 of the valve member 474 continually urges the member 474 in the direction of valve 97. Valve porting and guide member 476 is held in place with annular flange 478 maintained in bore 480 between shoulder 482 at the end of bore 480 in the body 461 and surface 484 of valve 97. Opening 486, FIGS. 6 and 7, in member 476 is in fluid communication with exhaust chamber 322 through passage 488 in valve 97. Passage 490 from opening 486, FIGS. 6 and 7, through annular flange 478 insures that the space 492 retaining valve member 474 and spring 468 will be open to fluid exhaust. Opening 486 also overlaps bore section 314 of valve 97 and insures that spool end 288 is under fluid exhaust pressure. If exhaust pressure of the system is greater than atmospheric pressure valve spool 280 will no longer be truly hydraulically balanced with the other end extending out into the atmosphere.

Control member porting and guide member 476 is provided with two cylinder bores 494 and 494' which extend through flange 478 and contain respective main actuating pistons 496 and 496' which engage member 474. Passages 498 and 498' are provided in valve 97 joining respective valve chambers 350 and 350' to respective cylinder bores 494 and 494' in order that the pressure of fluid in chambers 350 and 350' will be exerted on respective main actuating pistons 496 and 496'.

When pressures in chambers 350 and 350' are sufficiently high the combined force exerted through pistons 496 and 496' against flange 472 raises valve member 474 against the resilient pressure of spring 468. Pressure of spring 468 is such that when the pistons 496 and 496' have been moved to the position indicated in, for example, FIG. 11 of the drawings the pressures from the selector valve outlets have reached values corresponding to the horsepower limit in high speed. Oil under pressure then flows into respective passages 499 and 499' through respective check valves 500 and 500' which are included to prevent pressure being transmitted from one selector valve outlet through the overload valve 460 to the other selector valve outlet. Hydraulic fluid under pressure is carried by passages 499 and 499' up in member 476 and into annular space 502 defined by the outer wall of member 476 and the annular groove in member 474.

Passages 508 in member 476 carry the fluid through to annular chamber 510 within bore 512 of member 476 and between the top 514 of piston 464 and the bottom of the head 516 of piston 462. Fluid pressure in chamber 510 moves piston 464 down and shifts the setting of spool 280 from high to medium speed against the resilient resistance of spring 142 of manual control 284. At the same time fluid under pressure exerted through passage 518, FIG. 8, of member 476 to cylinder bore 520, FIGS. 7 and 8, lifts auxiliary piston 522 to help hold the overload valve open with passages 499 and 499' open. This auxiliary piston 522 prevents closing of passages 499 and 499' until the pressure has fallen considerably below the critical pressure value in high thereby eliminating a "hunting" condition in the event the horsepower requirements are such that pressures in chambers 350 and 350' are at the critical pressure. Plug 524 which is threaded into member 476 limits rise of piston 462 by pressure in annular chamber 510.

If horsepower requirements are such that pressure limits in second speed are exceeded then fluid pressures of chambers 350 and 350' exerted against respective main actuating pistons 496 and 496' and through passageways of valve 460 against auxiliary piston 522 lift member 474 still higher from the position of FIG. 11 to the position of FIG. 10 at which time fluid passing under pressure through passages 499 and 499' is passed through annular space 502 to passage 530 and to cylinder chamber 532. Fluid pressure in cylinder chamber 532 moves piston 462 and the extended shank passes through bore 536 of piston 464 and the end of the piston 462 pushes spool 280 from the second speed setting to the low speed setting against the resilient resistance of spring 142 of the manual control 284. At the same time fluid under pressure exerted through passage 540, FIGS. 7 and 9, of member 476 to cylinder bore 542 lifts an auxiliary piston 544 to help hold the valve member 474 in position as in FIG. 9 of the drawings with open fluid communication from chambers 350 and 350' to cylinder chamber 532. This prevents a "hunting" condition between medium and low speed settings when critical pressures are encountered in chambers 350 and 350' similar to the condition as between high and medium speed settings. Fluid passage 546 in piston 462 permits fluid in annular chamber 510 to move to bore 548 in the piston shank and exhaust therefrom as piston 462 moves downward. Fluid passage 550 in piston 462 permits fluid in cylinder chamber 532 to pass to bore 548 and exhaust as piston 462 is returned from the position of FIG. 10 to the position of FIG. 11. When chamber 510 is being enlarged during various stages of piston 462 and 464 return, fluid may be drawn through fluid passage 546 from bore 548 to chamber 510. Passage 552, FIGS. 6 and 7, from chamber 554 between piston 464 and member 476 to exhaust bore 486 prevents fluid lock of piston 464 by fluid in chamber 554.

Fluid passages 498 and 498' and passages in overload valve 460 are deliberately kept small so that flow restriction will prevent transient pressure increases from actuating the overload control means 460.

To set forth the operation of overload control means 460 again with selector valve 97 manually set in "high speed" (FIG. 12), if horsepower requirements become excessive, the control means 460 automatically shifts the selector valve 97 to "second speed" (FIG. 11), and if the horsepower requirement is still excessive, the control means 460 shifts the selector to "low speed" (FIG. 10). Protection in low speed against excessive horsepower requirements and fluid pressures is provided by by-pass valves 423 in valves 94 (FIGS. 16-19) and 94'. As soon as the cause of the excessive horsepower requirement is removed, the control means 460 permits the selector valve 97 to shift back into higher "speed" automatically. In the same manner, when the operator manually sets selector valve 97 in "second speed," if horsepower requirements become excessive, control means 460 automatically shifts the selector valve 97 to "low speed" and as soon as the cause of the excessive horsepower requirement is removed, the control means 460 permits selector valve 97 to shift back to "second speed" automatically.

Other embodiments of selector valves 97 and control means 460 may be used in various hydraulic power systems. For example, a single double pump could supply fluid under pressure to a valve equivalent of half the valve 97 with only one outlet chamber 350 and one outlet to a valve 94 and only one return from a valve 94 for use in a hydraulic power device. The control means 460 of this system would have only the pressure of one chamber 350 to move a single or multiple main piston(s) 496 in overcoming the pressure of spring 468 and move valve member 474 with annular space 502 to positions shown in FIGURES 11 and 10. It would, however, employ the same piston 522 and 544 as in control means 460. With such a control means fluid flow under pressure first to annular chamber 510 and then later to chamber 532 overcomes the pressure of spring 142 in the manual control handle 248 and moves the valve spool 280 successively from high to medium to low settings.

We claim:
1. A pressure fluid power system comprising plural sources of pressure fluid, pressure fluid flow selecting means, separate conduit means connecting each of the plural sources of pressure fluid to said pressure fluid flow selecting means, further conduit means connecting said flow selecting means to at least one pressure fluid actuated motor means, pressure fluid control means in said further conduit means between the flow selecting means and the motor means, manual actuating means for said flow selecting means, and pressure fluid actuated means to actuate said flow selecting means to override the manual actuating means in response to varying torque demand on said motor means.

2. A pressure fluid power system comprising plural sources of pressure fluid, pressure fluid flow selecting means connected by conduit means to said plural sources of pressure fluid, further conduit means connecting said flow selecting means to at least one pressure fluid actuated motor means, pressure fluid control means in said further conduit means between the flow selecting means and the motor means, manual actuating means for said flow selecting means, pressure fluid actuated means connected to said flow selecting means to override the manual actuating means in response to varying torque demand on said motor means, and resilient means between said manual actuating means and said flow selecting means, said pressure fluid responsive means adapted to override the resilient force of said resilient means when overriding the manual actuating means in response to varying torque demand on said motor means.

3. In combination pressure fluid control means adapted to be separately connected to plural sources of pressure fluid comprising a body member having a bore therein, a spool slidably mounted in the bore in the body member, plural lands and grooves on the spool, plural pressure fluid inlet means in the body member having separate connection to the plural sources of pressure fluid, plural pressure fluid outlet means in the body member, internal passages in the body member connecting the spool bore and the plural pressure fluid inlet and outlet means, manual actuating means for moving the spool in the bore whereby the lands and grooves thereon open and close communication between selected inlet means and selected outlet means to provide a selected output volume from the plural sources of pressure fluid through the bore and pressure fluid responsive means contacting said spool to override the manual actuating means for the spool for opening and closing communication between certain inlet and certain outlet means through the bore in the body member.

4. The invention defined in claim 3 wherein the pressure fluid responsive means contacting said spool is responsive to the pressure of the pressure fluid in said outlet means.

5. The invention defined in claim 3 wherein said pressure fluid responsive means includes plural pressure fluid actuated pistons in operative alignment with said spool, and conduit means connecting said pistons to the pressure fluid in said outlet means.

6. The invention defined in claim 5 including pressure responsive valve means in the conduit means between said pressure responsive pistons and said outlet means.

7. In combination pressure fluid control means adapted to be separately connected to plural sources of pressure fluid including a body member having a bore therein, a spool slidably mounted in the bore in the body member, plural lands and grooves on the spool, plural pressure fluid inlet means in the body member having separate connection to the plural sources of pressure fluid, plural pressure fluid outlet means in the body member, internal passages in the body member connecting the spool bore and the plural pressure fluid inlet and outlet means, manual actuating means for moving the spool in the bore whereby the lands and grooves thereon open and close communication between selected inlet means and selected outlet means to provide a selected output volume from the plural sources of pressure fluid through the bore and pressure fluid responsive means contacting said spool to override the manual actuating means for the spool for opening and closing communication between certain inlet means and certain outlet means through the bore in the body member, resilient means interconnecting the manual actuating means and the spool, and pressure fluid actuated piston means in said pressure fluid responsive means in operative communication with said spool in the body member.

8. The invention defined in claim 7 including conduit means connecting said piston means to the pressure fluid in said outlet means in the body member.

9. The invention defined in claim 8 including pressure responsive valve means in said conduit means connecting the piston means and the pressure fluid in the outlet means in the body member.

10. The invention defined in claim 9 wherein said valve means is responsive to pressure of the pressure fluid in said outlet means of the body member.

11. A pressure fluid power system comprising a prime mover; pump means driven by said prime mover; said pump means including a first capacity pump unit and a second capacity pump unit; manually controlled pressure fluid flow selecting means connected by conduit means to said pump means; further conduit means connecting said fluid flow selecting means to at least one pressure fluid actuated motor means; said fluid flow selecting means providing three fluid flow settings, a high volume flow combining the fluid flow from both said first capacity pump unit and said second capacity pump unit, a medium volume flow using the fluid flow from said first capacity pump unit and a low flow using the fluid flow from said second capacity pump unit for driving said pressure fluid actuated motor means; an output section in said fluid flow selecting means and automatic means in fluid communication with said output section and subject to fluid pressures in said output section for over-riding the manual control for said flow selecting means.

12. A pressure fluid power system comprising a prime mover; pump means driven by said prime mover; said pump means including two pump assemblies each having a first capacity pump unit and a second capacity pump unit; manually controlled pressure fluid flow selecting means connected by conduit means to said pump means; further conduit means connecting said fluid flow selecting means to two pressure fluid actuated motor means; said fluid flow selecting means constructed to provide three fluid flow settings for separate fluid flows to each of said motor means, including high volume flow combining the fluid flow from both said first capacity pump unit and said second capacity pump unit of each respective pump assembly, medium volume flow using the fluid flow from said first capacity pump unit of each respective pump assembly and low volume flow using the fluid flow from said second capacity pump unit of each respective pump assembly for driving respective pressure fluid actuated motor means; an output section in said fluid flow selecting means for each respective fluid flow to respective motor means and automatic means in fluid communication with said output sections and subject to combined fluid pressures of said output sections for overriding the manual control for said flow selecting means.

13. A pressure fluid power system comprising a prime mover; pump means driven by said prime mover; said pump means including multiple pump groups; multiple pumps in each of said pump groups; manually controlled pressure fluid flow selecting means connected by conduit means to said pump means; an output section in said fluid flow selecting means for each of said pump groups; an exhaust outlet in said fluid flow selecting means; said fluid flow selecting means adjustable to direct the fluid flow of the multiple pumps of each of said pump groups to the respective said output section; said fluid flow selecting means adjustable to send the output of some of said multiple pumps in each pump group to the respective said output section and the output of the remainder of said multiple pumps to exhaust; each said output section connected to a pressure fluid actuated device; and automatic means responsive to fluid pressures of said output sections for overriding the manual control for said flow selecting means; said automatic means including a fluid pressure actuated piston for each of said output sections with said fluid pressure actuated pistons and cylinders provided by means for fluid communication with each respective said output section, valve porting means in said automatic means biased in one direction by resilient means, all of said fluid pressure actuated pistons of the output sections acting against said valve porting means in opposition to said resilient means, cylinder and piston means in said automatic means for over-riding said manual control and movement of said valve porting means effective to open and to close respectively said cylinder and piston means to and from the fluid pressures of said output sections.

14. Pressure fluid control means comprising a body member having a bore therein, a spool slidably mounted in the bore in the body member, plural lands and grooves on the spool, plural pressure fluid inlet means in the body member, plural pressure fluid outlet means in the body member, internal passages in the body member connecting the spool bore and the plural pressure fluid inlet and outlet means, manual actuating means for moving the spool in the bore whereby the lands and grooves thereon open and close communication between selected inlet means and selected outlet means through the bore, pressure fluid responsive means contacting said spool to override the manual actuating means for the spool for opening and closing communication between certain inlet and certain outlet means through the bore in the body member, said pressure fluid responsive means including plural concentric pressure fluid actuated pistons in operative alignment with said spool and independently movable into and out of engagement with said spool, conduit means connecting said plural concentric pressure fluid actuated pistons to the pressure fluid in said outlet means, and pressure responsive valve means in said conduit means between said concentric pressure responsive pistons and said outlet means.

References Cited in the file of this patent

UNITED STATES PATENTS

| 1,791,013 | Rudolph | Feb. 3, 1931 |
| 2,074,618 | Roeder | Mar. 23, 1937 |
| 2,184,793 | Clench | Dec. 26, 1939 |
| 2,276,895 | Vosseler et al. | Mar. 17, 1942 |
| 2,363,235 | Ellinwood | Nov. 21, 1944 |
| 2,711,077 | Adams | June 21, 1955 |
| 2,733,732 | Baker | Feb. 7, 1956 |
| 2,917,897 | Shaffer | Dec. 22, 1959 |

FOREIGN PATENTS

| 1,080,123 | France | May 26, 1954 |

UNITED STATES PATENT OFFICE

CERTIFICATE OF CORRECTION

Patent No. 3,025,673                          March 20, 1962

James D. Brown et al.

It is hereby certified that error appears in the above numbered patent requiring correction and that the said Letters Patent should read as corrected below.

Column 12, line 19, for "by" read -- with --.

Signed and sealed this 3rd day of July 1962.

(SEAL)
Attest:

ERNEST W. SWIDER
Attesting Officer

DAVID L. LADD
Commissioner of Patents